United States Patent Office 3,223,710
Patented Dec. 14, 1965

3,223,710
2-β-METHOXYETHYLPYRIDINE AND
ITS PREPARATION
Norman Greenhalgh, Macclesfield, and Paul Arnall, of Four Ashes, near Wolverhampton, England, assignors to Imperial Chemical Industries Limited, Millbank, London, England, a corporation of Great Britain, and The Midland Tar Distillers Limited, Oldbury, near Birmingham, England, a corporation of Great Britain
No Drawing. Filed Nov. 7, 1960, Ser. No. 67,481
Claims priority, application Great Britain, Dec. 1, 1959, 40,845/59; Dec. 2, 1959, 40,931/59; June 8, 1960, 20,099/60
8 Claims. (Cl. 260—297)

This invention relates to a new anthelmintic and more particularly it relates to 2-β-methoxyethylpyridine which we have found to be effective in removing a wide variety of worms from laboratory and domestic animals and is thus of value in the treatment of man and of animals suffering from worm infestations.

According to the invention therefore we provide the new chemical compound 2-β-methoxyethylpyridine and pharmaceutically-acceptable salts thereof.

The said new compound in the form of the free base is a colourless, mobile liquid of B.P. 94–96° C. at 17 mm. It forms a hydrochloride, M.P. 104–105° C., a hydrobromide, M.P. 84–86° C., a picrate, M.P. 130–131° C. and a picrolonate, M.P. 149–151° C. It has a density (g./ml.) of $0.998^{20}$ and a refractive index of $1.4975^{20}$.

According to a further feature of the invention we provide a process for the manufacture of the said 2-β-methoxyethylpyridine which comprises heating either 2-vinylpyridine or 2-β-hydroxyethylpyridine with methanol.

The said process is conveniently carried out by heating the reactants together in the liquid state or in the vapour state and either at atmospheric pressure or at superatmospheric pressure. The process may advantageously be carried out in the presence of a catalyst which may be an acidic or a basic catalyst. As a suitable basic catalyst there may be mentioned for example ammonia, an alkali metal or alkaline earth metal hydroxide for example sodium hydroxide or calcium hydroxide, a quaternary ammonium hydroxide for example benzyltrimethylammonium hydroxide, an alkali metal carbonate for example sodium carbonate, a tertiary amine for example trimethylamine, triethylamine, dimethylaniline, diethylaniline or triethanolamine, an alkali metal alkoxide for example sodium or potassium methoxide or sodium or potassium ethoxide, or an anionic exchange resin for example the product available commercially as Amberlite IRA 400 (OH).

As a suitable acidic catalyst there may be mentioned for example sulphuric acid, acetic acid, phosphoric acid, an acid salt for example sodium dihydrogen phosphate or potassium pyrosulphate, a Lewis acid for example calcium chloride, zinc chloride or boron trifluoride or an acid-acting compound for example alumina, or an acid activated earth for example Fullers acid activated earth or a cationic exchange resin.

The process is conveniently carried out in the presence of a diluent or solvent which may be for example an excess of one of the reactants for example methanol or it may be toluene, xylene or a mixture of diphenyl and diphenylether, the said mixture being commercially available as Dowtherm A.

Preferred catalysts are alkali metal hydroxides for example sodium hydroxide, mineral acids for example sulphuric acid, and acid-reacting salts thereof or Lewis acids for example sodium dihydrogen phosphate, zinc chloride and boron trifluoride. It is preferred to use between about 0.001 and about 1.0 of a molecular proportion of the catalyst and more particularly between about 0.2 and about 0.7 of a molecular proportion of the catalyst based upon the amount of 2-vinylpyridine or 2-β-hydroxyethylpyridine used as starting material.

It is to be understood that either one or both reactants in the above process can be generated in situ using appropriate starting materials which under the conditions of the reaction used function as 2-vinylpyridine and methanol or as 2-β-hydroxyethylpyridine and methanol. Thus 2-β-hydroxyethylpyridine used as starting material may be generated in situ by interaction of α-picoline and formaldehyde conveniently in an aqueous reaction medium under super-atmospheric pressure and at an elevated temperature for example by heating α-picoline and aqueous formaldehyde solution at about 130–160° C. for several hours. The aqueous reaction medium containing the 2-β-hydroxyethylpyridine so obtained may be used as starting material without further purification or it may be purified, before further use, by distillation to remove water and/or unreacted α-picoline. Alternatively, the α-picoline, formaldehyde in the form of an aqueous solution or as paraformaldehyde or as trioxymethylene, and methanol can be heated together directly in a single stage process with or without a catalyst for example sodium methoxide present thus providing 2-β-methoxyethylpyridine. The formaldehyde and methanol may alternatively be used in the form of formaldehyde dimethylacetal and again on heating with α-picoline, the desired 2-β-methoxyethylpyridine is obtained. Finally the formaldehyde and methanol may be replaced by monochloro- or monobromo-dimethylether (methoxymethyl chloride or bromide) and again on heating with α-picoline the desired product 2-β-methoxyethylpyridine is obtained.

A convenient process comprises heating methanol with either 2-vinylpyridine or 2-β-hydroxyethylpyridine in the presence of sodium hydroxide and at superatmospheric pressure.

A preferred procedure for carrying out the process of the invention, as far as economics and purity of final product are concerned, is generation of the 2-β-hydroxyethylpyridine in situ from α-picoline and aqueous formaldehyde followed by removal of the water and excess α-picoline by distillation and then reaction of the crude β-hydroxyethylpyridine so obtained with methanol in the presence of sodium hydroxide.

According to yet a further feature of the invention we provide anthelmintic compositions for the treatment of man and of domestic animals characterised by the presence therein of 2-β-methoxyethylpyridine or a pharmaceutically-acceptable salt thereof as active anthelmintic ingredient together with a pharmaceutically-acceptable diluent or carrier therefor.

As stated above we have found that this new compound possesses valuable anthelmintic properties. Thus we have found that it is effective in the removal of a wide range of worm species and moreover a wide range of developmental forms of these species in laboratory and domestic animals. Thus for example we have found that it can be used to eliminate infestations of *Heterakis spumosa, Nippostrongylus muris* and *Nematospiroides dubius* from mice and we have further found that it may be used to eliminate infestations of for example *Haemonchus contortus, Ostertagia circumcincta,* Trichostrongylus spp., Cooperia spp., Nematodirus spp., Oesophagostomum spp. and Chabertia spp. from sheep and infestations of Ostertagia spp., Cooperia spp. and Nematodirus spp. from cattle. These infestations are eliminated whether the infesting organism is present in the mature form or in certain developmental stages. Thus it is proposed to administer the said 2-β-methoxyethylpyridine and its salts to man and to animals suffering from worm infestations.

The 2-β-methoxyethylpyridine and its salts may be administered for example orally and surprisingly, also parenterally. Parenteral administration may be carried out for example by subcutaneous injection.

The 2-β-methoxyethylpyridine and is salts may indeed be administered either orally or parenterally as such for example orally in the form of capsules or parenterally in the form of an injection of the sterile material.

Conveniently the 2-β-methoxyethylpyridine may, as stated, be administered in the form of anthelmintic compositions. Such compositions may be designed either for oral or parenteral administration and in general may contain standard excipients known to pharmacy, for example inert diluents, filler, disintegrating agents, bacteriostats, bactericidal agents, sporicidal agents, stabilising agents, thickening agents, preservatives and pharmaceutically-acceptable colouring agents. The compositions may also optionally contain other drugs of veterinary utility and/or mineral salts.

Thus compositions such as are suitable for oral administration may be liquid or solid compositions. Suitable liquid compositions include for example aqueous or oily solutions of the 2-β-methoxyethylpyridine either as such or in the form of its salts, for example the hydrochloride. Solid compositions include solid salts or derivatives of the 2-β-methoxyethylpyridine in the form of tablets, slugs, pellets or capsules made up with standard tablet-forming excipients. Solid compositions also include for example 2-β-methoxyethylpyridine as such adsorbed on to absorbent excipients for example kieselguhr or an ion exchange resin from which tablets or capsules can be prepared. Alternatively compositions for oral administration may be contained in foodstuffs.

Compositions suitable for parenteral administration include sterile aqueous solutions of 2-β-methoxyethylpyridine and/or of its salts. Again they may include also sterile oily solutions.

The compositions may contain stabilising agents to prevent or reduce the development of colour in 2-β-methoxyethylpridine. These may be for example hydroxylamine and its salts for example the hydrochloride or the sulphate, formaldoxime, ammonium salts for example ammonium chloride, and tin salts for example stannous chloride. The stabilising agent may be present in the compositions to the extent of about 0.001–5% by weight and preferably to the extent of about 0.1–1% by weight.

Veterinary drugs and/or minerals which may be present in the veterinary compositions of this invention depending upon the mode of administration of the said compositions include for example cyanacethydrazide, phenothiazine, hexachloroethane, piperazine, 1-diethylcarbamyl - 4 - methylpiperazine, carbon tetrachloride, 3,3′,5,5′,6,6′ - hexachloro - 2:2′ - dihydroxydiphenylmethane, 3,3′,4,4′,5,5′,6,6′, - octachloro - 2,2′ - dihydroxydiphenylmethane, copper sulphate, sodium bicarbonate and cobalt sulphate.

A preferred composition for oral use is an aqueous solution containing between about 10% and 60% by weight of 2-β-methoxyethylpyridine, the said solution containing also about 0.1% by weight of a colour-stabilising agent, for example hydroxylamine hydrochloride, and about 0.5 to 3% by weight of a thickening agent for example sodium carboxymethylcellulose or gum tragacanth in order to provide a preparation convenient for administration as a drench by means of a drench gun.

A preferred composition for parenteral use especially for subcutaneous use is a sterile aqueous solution containing between about 70% and 95% by weight of 2-β-methoxyethylpyridine and about 0.1% of a colour-stabilising agent for example hydroxylamine hydrochloride.

As indicated above, the compound with which this invention is concerned is effective in removing a wide variety of worms from domestic animals. During trials in sheep, the compound has been administered either orally as a single dose at the rate of 150–300 mg./kg. or subcutaneously as a single dose at the rate of 100–300 mg./kg. and excellent results have been obtained as indicated by the percentage reduction of worm burdens in the sheep. These trials indicate that a dose of about 200 mg./kg. of body weight is an optimum dose for the treatment of sheep.

The compound is equally effective as an anthelmintic in cattle as in sheep. When infected cattle were dosed with a single dose at the rate of 200 mg./kg., administered subcutaneously, the resultant reduction in worm burden compared with that of untreated control animals was impressive. The treated animals showed a 95% reduction in total worm count with individual nematode species varying from 81% reduction (Ostertagia spp.) to 100% reduction (Cooperia and Nematodirus spp.). In a later trial, a similar dose resulted in a 100% reduction of faecal egg counts (nematodes) seven days after treatment.

The process for the treatment of domestic animals, particularly sheep and cattle, by administration of 2-β-methoxyethylpyridine will depend upon the weight of animal to be treated, the worm infestation of the animal concerned and its general condition of health at the time of treatment. It is expected that administration of one or more doses at the rate of 100–300 mg./kg. of body weight and more particularly at a dosage rate of about 175–250 mg./kg. of body weight of animal will be satisfactory for the treatment of worm infestations. The compound has now been administered to more than 500 infested sheep and more than 250 infested cattle with highly successful results.

The invention is illustrated but not limited by the following examples in which the parts are by weight:

*Example 1*

A mixture of 20 parts of 2-vinylpyridine and a solution obtained by adding 2.5 parts of sodium to 60 parts of methanol is heated in a sealed vessel for 12 hours at 120° C. The mixture is then acidified with 50 parts of hydrochloric acid (density 1.18) and then evaporated to dryness under reduced pressure. The residual solid is basified with 70 parts of aqueous sodium hydroxide (density 1.35) and the mixture extracted four times with 100 parts of ether. The ethereal solution is then dried over sodium hydroxide and then evaporated and the residue is distilled under reduced pressure. There is thus obtained 2-β-methoxyethylpyridine as a colourless mobile liquid, B.P. 94–96° C./17 mm.

*Example 2*

A mixture of 9.3 parts of α-picoline, 5.1 parts of formaldehyde (used as paraformaldehyde) and a solution obtained by adding 2.3 parts of sodium to 30 parts of methanol is heated in a sealed vessel for 20 hours at 110–120° C. The mixture is acidified to Congo red with 25 parts of concentrated hydrochloric acid (density 1.18) and the mixture is evaporated to dryness under reduced pressure. The residue is basified with 25 parts of aqueous sodium hydroxide (density 1.35), the mixture is extracted four times with 100 parts of ether and the ethereal solution is dried over sodium hydroxide. The ether is then evaporated and the residue is distilled under reduced pressure. There is thus obtained 2-β-methoxyethylpyridine, B.P. 94–96° C./17 mm.

The above process is repeated using 3.9 parts of potassium in place of 2.3 parts of sodium as starting material. There is likewise obtained 2-β-methoxyethylpyridine, B.P. 94–96° C./17 mm.

*Example 3*

A mixture of 9.3 parts of α-picoline, 5.1 parts of formaldehyde (used as paraformaldehyde) and a solution of 1.4 parts of anhydrous zinc chloride in 30 parts of methanol is heated in a sealed vessel for 20 hours at 150° C. The mixture is acidified to Congo red with 25 parts of concentrated hydrochloric acid (density 1.18) and the mixture is evaporated to dryness under reduced pressure. The residue is basified with 25 parts of aqueous sodium hydroxide (density 1.35), the mixture is extracted four times with 100 parts of ether each time and the ethereal solution is dried over sodium hydroxide. The ether is then evaporated and the residue is distilled under reduced pressure. There is thus obtained 2-β-methoxyethylpyridine, B.P. 94–96° C./17 mm. The paraformaldehyde in the above process may be replaced by trioxymethylene and there is likewise obtained 2-β-methoxyethylpyridine, B.P. 94–96° C./17 mm.

*Example 4*

370 parts of 2-β-hydroxyethylpyridine are added to a solution of 40 parts of sodium hydroxide in 480 parts of methanol and the mixture is heated in an autoclave at 120–130° C. for 12 hours. It is then cooled and the catalyst is neutralised by the addition of 49 parts of sulphuric acid and the mixture is filtered. The filtrate is subjected to distillation firstly at atmospheric pressure to remove methanol and then under reduced pressure. There is thus obtained 2-β-methoxyethylpyridine, B.P. 94–96° C./17 mm.

*Example 5*

A mixture of 300 parts of α-picoline and 120 parts of 37% w./w. aqueous formaldehyde solution is heated in an autoclave at 145° C. for 6 hours. The reaction mixture is cooled to about 50° C. and there is added thereto, a solution of 24 parts of sodium hydroxide in 296 parts of methanol and the mixture is then heated at 120–130° C. for a further 12 hours. It is then cooled and the catalyst is neutralised by the addition of 29 parts of sulphuric acid. The mixture is subjected to distillation firstly at atmospheric pressure to remove methanol and then under reduced pressure. There is thus obtained 2-β-methoxyethylpyridine, B.P. 94–96° C./17 mm.

*Example 6*

A mixture of 300 parts of α-picoline and 120 parts of 37% w./w. of aqueous formaldehyde solution is heated in an autoclave at 145° C. for 6 hours. The reaction mixture is then subjected to distillation at atmospheric pressure to remove water and unchanged α-picoline. The residue is treated with 296 parts of methanol followed by a solution of 24 parts of sodium hydroxide in 24 parts of water and the mixture so obtained is heated at 120–130° C. for a further 12 hours. It is then cooled and the catalyst is neutralised by the addition of 29 parts of sulphuric acid. The mixture is subjected to distillation firstly at atmospheric pressure to remove methanol and then under reduced pressure. There is thus obtained 2-β-methoxyethylpyridine, B.P. 94–96° C./17 mm.

*Example 7*

A mixture of 315 parts of 2-vinylpyridine and 480 parts of methanol is heated together at 120° C. for 12 hours in an autoclave. The reaction mixture is then fractionally distilled under reduced pressure and there is thus obtained 2-β-methoxyethylpyridine, B.P. 94–96° C./17 mm.

*Example 8*

A mixture of 210 parts of 2-vinylpyridine and a solution obtained by adding 25 parts of sodium to 800 parts of methanol is heated under reflux for 24 hours. The reaction mixture is then cooled and the catalyst is neutralised with hydrochloric acid. The mixture is filtered and the filtrate is fractionally distilled under reduced pressure and there is thus obtained 2-β-methoxyethylpyridine, B.P. 94–96° C./17 mm.

*Example 9*

A mixture of 315 parts of 2-vinylpyridine and a solution of 40 parts of sodium hydroxide in 480 parts of methanol is heated together in an autoclave at 120° C. for 12 hours. The reaction mixture is cooled, the catalyst is neutralised with sulphuric acid and the mixture is filtered. On fractional distillation under reduced pressure, the filtrate gives 2-β-methoxyethylpyridine, B.P. 94–96° C./17 mm.

The above process is repeated using 80 parts of 50% aqueous sodium hydroxide in place of the 40 parts of sodium hydroxide. There is likewise obtained in a similar manner 2-β-methoxyethylpyridine, B.P. 94–96° C./17 mm.

*Example 10*

A mixture of 105 parts of 2-vinylpyridine, 80 parts of methanol and 10 parts of an anion exchange resin [Amberlite IRA 400 (OH)] is heated under reflux for 96 hours. The reaction mixture is filtered and the filtrate is distilled under reduced pressure. There is thus obtained 2-β-methoxyethylpyridine, B.P. 94–96° C./17 mm.

The above process is repeated using 10 parts of a 40% aqueous solution of benzyltrimethylammonium hydroxide in place of the 10 parts of anion exchange resin. There is thus obtained in a similar manner 2-β-methoxyethylpyridine, B.P. 94–96° C./17 mm.

*Example 11*

A mixture of 157 parts of 2-vinylpyridine, 17 parts of ammonia and 240 parts of methanol is heated in an autoclave at 120–130° C. for 12 hours. The reaction mixture is then fractionally distilled under reduced pressure and there is thus obtained 2-β-methoxyethylpyridine, B.P. 94–96° C./17 mm.

When the 17 parts of ammonia are replaced by 50 parts of triethanolamine in the above process, there is likewise obtained 2-β-methoxyethylpyridine, B.P. 94–96° C./17 mm.

*Example 12*

A mixture of 157 parts of 2-vinylpyridine, 240 parts of methanol and 53 parts of sodium carbonate is heated at 120–130° C. for 12 hours. The mixture is then filtered and the filtrate is fractionally distilled under reduced pressure. There is thus obtained 2-β-methoxyethylpyridine, B.P. 94–96° C./17 mm.

The process described above is repeated except that the 53 parts of sodium carbonate used as starting material are replaced either by 50 parts of fuller's acid-activated earth (No. FE 237 from the Fuller's Earth Union), or by 75 parts of sodium dihydrogen phosphate, or by 84 parts of potassium pyrosulphate or by 56 parts of calcium chloride or by 68 parts of zinc chloride. There is thus obtained in a similar manner 2-β-methoxyethylpyridine, B.P. 94–96° C./17 mm.

*Example 13*

A mixture of 79 parts of 2-vinylpyridine, 120 parts of methanol and 16 parts of sulphuric acid is heated at 130–140° C. in an autoclave for 12 hours. The catalyst is then neutralised and the mixture is filtered. The filtrate is fractionally distilled under reduced pressure and there is thus obtained 2-β-methoxyethylpyridine, B.P. 94–96° C./17 mm.

When the 16 parts of sulphuric acid are replaced by 20 parts of acetic acid in the above process there is likewise obtained 2-β-methoxyethylpyridine, B.P. 94–96° C./17 mm.

Example 14

A mixture of 93 parts of 2-β-hydroxyethylpyridine and 120 parts of methanol is heated at 130–140° C. for 12 hours and is then fractionally distilled under reduced pressure. There is thus obtained 2-β-methoxyethylpyridine, B.P. 94–96° C./17 mm.

The above process is repeated using as an additional reactant in the reaction mixture either 16.5 parts of triethylamine or 25 parts of triethanolamine and there is likewise obtained 2-β-methoxyethylpyridine, B.P. 94–96° C./17 mm.

Example 15

A mixture of 1230 parts of 2-β-hydroxyethylpyridine is heated under reflux with a solution obtained by adding 125 parts of sodium to 1200 parts of methanol for 24 hours. The catalyst is neutralised with sulphuric acid and the mixture is filtered. The filtrate on fractional distillation under reduced pressure gives 2-β-methoxyethylpyridine, B.P. 94–96° C./17 mm.

Example 16

A mixture of 187 parts of 2-β-hydroxyethylpyridine, 240 parts of methanol and 50 parts of sodium carbonate is heated in an autoclave at 180° C. for 12 hours and then filtered. The filtrate is fractionally distilled under reduced pressure and there is thus obtained 2-β-methoxyethylpyridine, B.P. 94–96° C./17 mm.

The above process is repeated using either 28 parts of calcium hydroxide or 50 parts of fuller's acid-activated earth (No. FE 237 from the Fuller's Earth Union) or 50 parts of alumina in place of the 50 parts of sodium carbonate. There is thus obtained in a similar manner 2-β-methoxyethylpyridine, B.P. 94–96° C./17 mm.

Example 17

A mixture of 93 parts of 2-β-hydroxyethylpyridine, 120 parts of methanol and 37 parts of sodium dihydrogen phosphate is heated in an autoclave at 130–140° C. for 12 hours. The mixture is filtered and the filtrate is fractionally distilled under reduced pressure. There is thus obtained 2-β-methoxyethylpyridine, B.P. 94–96° C./17 mm.

When the 37 parts of sodium dihydrogen phosphate are replaced by either 42 parts of potassium pyrosulphate, or by 28 parts of calcium chloride, or by 34 parts of zinc chloride or by 17 parts of boron trifluoride (as its 30% complex with pyridine), there is likewise obtained 2-β-methoxyethylpyridine, B.P. 94–96° C./17 mm.

Example 18

A mixture of 93 parts of 2-β-hydroxyethylpyridine, 120 parts of methanol and 9 parts of phosphoric acid is heated in an autoclave at 120–130° C. for 12 hours. The catalyst is neutralised with alkali and the mixture is filtered. The filtrate is fractionally distilled under reduced pressure and there is thus obtained 2-β-methoxyethylpyridine, B.P. 94–96° C./17 mm.

When the 9 parts of phosphoric acid are replaced by either 16 parts of sulphuric acid or by 10 parts of acetic acid, there is likewise obtained 2-β-methoxyethylpyridine, B.P. 94–96° C./17 mm.

Example 19

To a solution obtained by adding 23 parts of sodium to 480 parts of methanol are added 215 parts of xylene and the mixture is fractionally distilled to remove excess of methanol. 105 parts of 2-vinylpyridine are then added and the mixture is heated under reflux for 24 hours. The reaction mixture is then poured into water to decompose the sodium salt of the desired product and the alkali is removed by washing with water. The xylene solution is fractionally distilled under reduced pressure and there is thus obtained 2-β-methoxyethylpyridine, B.P. 94–96° C./17 mm.

When the 105 parts of 2-vinylpyridine are replaced by 123 parts of 2-β-hydroxyethylpyridine, there is likewise obtained 2-β-methoxyethylpyridine, B.P. 94–96° C./17 mm.

Example 20

A mixture of equal parts of α-picoline and formaldehyde dimethylacetal is vapourised and the vapor is passed through a tube containing granular alumina at a temperature of 415–435° C. at the rate of 216 mls. of mixture per litre of catalyst per hour. The effluent vapours are condensed and the condensate is fractionally distilled under reduced pressure. There is thus obtained 2-β-methoxyethylpyridine, B.P. 94–96° C./17 mm.

When the formaldehyde dimethylacetal in the above process is replaced by monochlorodimethyl ether and the condensate so obtained is washed with alkali before distillation under reduced pressure, there is likewise obtained 2-β-methoxyethylpyridine, B.P. 94–96° C./17 mm.

Example 21

1 part of 2-β-methoxyethylpyridine is dissolved in 50 parts of anhydrous ether. An excess of anhydrous ethereal hydrogen chloride is added, and the precipitated 2-β-methoxyethylpyridine hydrochloride is then crystallized from a mixture of methanol and ether. It has M.P. 104–105° C.

The above process is repeated using anhydrous ethereal hydrogen bromide and there is likewise obtained 2-β-methoxyethylpyridine hydrobromide, M.P. 84–86° C.

Example 22

An excess of a saturated solution of picric acid in methanol is added to a solution of 1 part of 2-β-methoxyethylpyridine in 5 parts of methanol and the mixture is heated to the boil. After cooling, the yellow needles of 2-β-methoxyethylpyridine picrate are collected and washed with a minimum of methanol and then dried. The product has M.P. 1300–131° C.

Example 23

An excess of a saturated solution of picrolonic acid in methanol is added to a solution of 1 part of 2-β-methoxyethylpyridine in 5 parts of methanol and the mixture is heated to the boil. After cooling, the yellow needles of 2-β-methoxyethylpyridine picrolonate are collected and washed with a minimum of methanol and then dried. The product has M.P. 149–151° C.

Example 24

34 parts of 3,3′,5,5′-tetrachloro-2,2′-dihydroxydiphenylmethane and 14 parts of 2-β-methoxyethylpyridine are dissolved in 250 parts of ether. The ether is evaporated and the residual solid is triturated several times with water and is finally stirred with water and filtered. The solid residue is dried in air and there is thus obtained an equimolecular complex of 3,3′,5,5′-tetrachloro-2,2′-dihydroxydiphenylmethane with 2-β-methoxyethylpyridine, melting gradually between 70° C. and 125° C.

Example 25

5 parts of 2-β-methoxyethylpyridine and 5 parts of distilled water are mixed and the solution is sterilised by heating under a pressure of 15 lb./sq. in. for 20 minutes. There is thus obtained a sterile solution suitable for injection for the treatment of helminthiases in domestic animals.

Example 26

3.0 parts of hydrochloric acid (density 1.18) are added at 20° C. to 5 parts of 2-methoxyethylpyridine and 2.5 parts of distilled water added to the mixture. The resulting solution is sterilised by Seitz filtration and there is thus obtained a sterile solution of 2-methoxyethylpyridine hydrochloride suitable for injection for the treatment of helminthiases in domestic animals.

*Example 27*

5 parts of 2-β-methoxyethylpyridine and 5 parts of arachis oil are mixed and the solution heated at 150° C. for 2 hours. There is thus obtained a sterile oily solution suitable for injection for the treatment of helminthiases in domestic animals.

*Example 28*

990 parts of 2-β-methoxyethylpyridine and 110 parts of water are mixed and the resultant solution is sterilised by passage through a Seitz filter. There is thus obtained a sterile aqueous solution suitable for injection for the treatment of helminthiases in domestic animals.

The above process is repeated using as starting materials 990 parts of 2-β-methoxyethylpyridine, 110 parts of water and 1.1 parts of hydroxylamine hydrochloride. There is thus obtained a sterile, colour-stable, aqueous solution suitable for injection for the treatment of helminthiases in domestic animals.

*Example 29*

90 parts of 2-β-methoxyethylpyridine, 0.1 part of hydroxylamine hydrochloride, 0.42 part of 36% aqueous formaldehyde and 9 parts of water are mixed together. There is thus obtained a colour-stabilised, aqueous solution suitable for injection for the treatment of helminthiases in domestic animals.

The above process is repeated using a mixture of preformed formaldoxime and formaldehyde in place of the hydroxylamine hydrochloride and aqueous formaldehyde and there is likewise obtained a colour-stabilised, sterile, aqueous solution suitable for injection for the treatment of helminthiases in domestic animals.

*Example 30*

2 parts of 2-β-methoxyethylpyridine are dissolved in 9.2 parts of water. There is thus obtained a solution suitable for the oral treatment of helminthiases in domestic animals.

*Example 31*

A mixture of 2 parts of 2-β-methoxyethylpyridine and 0.2 part of sodium carboxymethylcellulose is made up to 11.2 parts with water. There is thus obtained a solution suitable for oral administration to domestic animals for the treatment of helminthiases.

When the 0.2 part of sodium carboxymethylcellulose is replaced by 0.1 part of gum tragacanth or by 0.15 part of a high molecular weight polyethylene glycol, there is likewise obtained a solution suitable for administration to domestic animals for the treatment of helminthiases.

*Example 32*

A mixture of 2 parts of 2-β-methoxyethylpyridine and 5 parts of white soft paraffin is diluted to 11.2 parts with liquid paraffin. There is thus obtained an oily solution suitable for oral administration to domestic animals for the treatment of helminthiases.

*Example 33*

100 parts of 2-β-methoxyethylpyridine are mixed with a solution of 10 parts of cyanacethydrazide in 100 parts of water. There is thus obtained a mixture suitable for oral administration to domestic animals for the simultaneous treatment of lungworm disease and intestinal helminthiases.

*Example 34*

200 parts of 2-β-methoxyethylpyridine, 60 parts of 1-diethylcarbamyl-4-methylpiperazine dihydrogen citrate and 340 parts of water are mixed together. There is thus obtained a mixture suitable for oral administration to animals for the simultaneous treatment of lungworm disease and intestinal helminthiases.

*Example 35*

55 parts of 2-β-methoxyethylpyridine, 165 parts of phenothiazine, 2.5 parts of sodium di-isopropylnaphthalene sulphonate (as wetting agent) and 500 parts of water are mixed together and ball-milled. The mixture is separated from the balls and there is thus obtained a mixture suitable for oral administration to domestitc animals for the treatment of helminthiases.

*Example 36*

10 parts of 2-β-methoxyethylpyridine and 3 parts of carbon tetrachloride are mixed together. There is thus obtained a solution suitable for intramuscular injection to domestic animals for the simultaneous treatment of liverfluke disease and intestinal helminthiases.

*Example 37*

A mixture of 75 parts of 2-β-methoxyethylpyridine, 15 parts of 3,3′,4,4′,5,5′,6,6′-octachloro-2,2′-dihydroxydiphenylmethane, 0.75 part of a condensation product of octylcresol with 8–10 molecular proportions of ethylene oxide (used as a wetting agent) and 225 parts of water is ballmilled for 20 hours. The mixture is separated from the balls and there is thus obtained a suspension suitable for oral administration to domestic animals for the simultaneous treatment of liver-fluke disease and intestinal helminthiases.

*Example 38*

A mixture of 200 parts of 2-β-methoxyethylpyridine, 20 parts of 3,3′,5,5′,6,6′-hexachloro-2,2′-dihydroxydiphenylmethane, 1.5 parts of a condensation product of octylcresol with 8–10 molecular proportions of ethylene oxide (as wetting agent) and 400 parts of water is ball-milled for 20 hours. The mixture is separated from the balls and there is thus obtained an aqueous suspension suitable for oral administration to domestic animals for the simultaneous treatment of liver-fluke disease and intestinal helminthiases.

*Example 39*

A mixture of 250 parts of 2-β-methoxyethylpyridine hydrochlororide, 125 parts of maize starch, 300 parts of lactose and 1 part of magnesium stearate is compressed into slugs. The compressed material is then crushed and passed through a 16-mesh screen. The granules thus obtained are compressed into tablets which are coated by tumbling in a tablet-coating pan with the simultaneous addition of a sufficient quantity of a solution of 20 parts of white beeswax in 80 parts of petroleum ether (B.P. 120–140° C.). The tablets thus obtained are suitable for oral administration in the treatment of helminthiases in domestic animals.

*Example 40*

100 parts of 2-β-methoxyethylpyridine are added gradually to 200 parts of kieselguhr which is being stirred in a suitable mixer. To the mixture thus obtained are added 25 parts of maize starch and 1 part of magnesium stearate. The mixture so obtained is compressed into slugs which are then broken into granules and passed through an 8-mesh screen. The granules thus obtained are compressed into tablets which are coated by the procedure described in Example 39. There are thus obtained tablets suitable for oral use for the treatment of helminthiases in domestic animals.

*Example 41*

100 parts of 2-β-methoxyethylpyridine are added gradually to 250 parts of kieselguhr which is being stirred in a suitable mixer. The solid so obtained is filled into hard gelatine capsules. There are thus obtained capsules which are suitable for oral administration for the treatment of helminthiases in man or in domestic animals.

Example 42

90 parts of 2-β-methoxyethylpyridine, 0.01 part of eosine and 10 parts of water are mixed and the resultant solution is sterilised by passage through a Seitz filter. There is thus obtained a coloured sterile aqueous solution suitable for injection for the treatment of helminthiases in domestic animals.

The 0.01 part of eosine may be replaced by 0.01 part of Orange G or by 0.1 part of other colouring materials commercially available as Edicol Supra Brown OHS; Edicol Supra Carmoisine; Edicol Supra Orange AG; Edicol Supra Tartrazine or Edicol Supra Yellow YS; or by 0.02 part of Oil Yellow G.G or Edicol Supra Rose B.S. There are thus obtained in a similar manner coloured sterile aqueous solutions suitable for injection for the treatment of helminthiases in domestic animals.

Example 43

A mixture of 5 parts 2-β-methoxyethylpyridine, 1 part of methylcellulose and 8 parts of a 5% solution of copper sulphate is made up to 15 parts with water. There is thus obtained a mixture suitable for oral administration to domestic animals for the treatment of helminthiases.

Example 44

40 parts of a 50% aqueous solution of 2-β-methoxyethylpyridine is added to 60 parts of a saturated aqueous solution of sodium bicarbonate. There is thus obtained a solution suitable for oral administration to cattle for the treatment of helminthiases.

Example 45

4.6 parts of a sulphonated, cross-linked polystyrene resin ("Zeocarb 225") of particle size 50 microns, are added to a solution of 1.4 parts of 2-β-methoxyethylpyridine in 20 parts of water. The mixture thus obtained is stirred and filtered and the residue is washed with water and dried. There is thus obtained a 2-β-methoxyethylpyridine salt of a sulphonated polystyrene suitable for oral administration to man or to animals for the treatment of helminthiases.

Example 46

Two hundred and ninty-four cattle, ranging in age from 4 months to 3 years and carrying a wide range of intestinal worm species, have been treated by administration of 2-β-methoxyethylpyridine. In all animals there is a marked reduction in the worm burden and an improvement in the clinical condition and the following field trial is typical of the treatment given and the results obtained.

Twenty-six Friesian cattle aged between 12 and 18 months and weighing from 200 kg. to 250 kg. live weight and infected with mixed species of intestinal nematodes (including Haemonchus, Ostertagia, Trichostrongylus, Cooperia, Nematodirus and Trichuris spp.), having an average worm egg count of 300 eggs/gm. of faeces were treated by administration of 2-β-methoxyethylpyridine either (i) as a sterile 90% w./w. solution in water, containing 0.1% w./w. of hydroxylamine hydrochloride as a colour-stabilising agent, given by subcutaneous injection, or (ii) as a 30% w./w. solution in water given orally. In both subcutaneous and oral routes, the amount of drug administered was at the rate of 200 mg./kg. of body weight.

Fourteen of the animals were treated by subcutaneous injection and in seven days, the faeces of eleven of these animals were free from worm eggs and the other three animals had their egg counts reduced to 16% of the original worm counts.

The remaining twelve animals were treated by oral dosing and in seven days, the faeces of eleven of these animals were free from worm eggs and the twelfth animal had its egg count reduced to 15% of its original count.

In all twenty-six animals it was observed that within 48 hours from administration, the diarrhoea due to the parasites had ceased and the animals were eating well. Clinical improvement and weight gains in the animals were then most marked.

Example 47

Three hundred and forty-four lambs and sheep, ranging in age from 2 months to 6 years and carrying a wide range of intestinal worm species, have been treated by administration of 2-β-methoxyethylpyridine. In all animals there is a marked reduction in the worm burden and an improvement in the clinical condition and the following field trial is typical of the treatment given and the results obtained.

Thirty-six Clun Forest lambs aged five months and carrying a pathological infection of intestinal worms were treated as follows: (i) twelve animals were given 2-β-methoxyethylpyridine (prepared as a sterile 90% w./w. solution in water containing 0.1% w./w. of hydroxylamine hydrochloride as a colour-stabilising agent) at a dose of 200 mg./kg. of body weight by subcutaneous injection into the neck, (ii) twelve animals were given 2-β-methoxyethylpyridine (prepared as a 30% w./w. solution in water containing 0.1% w./w. of hydroxylamine hydrochloride as a colour-stablising agent) at a dose of 200 mg./kg. by the oral route and (iii) twelve animals remained untreated as controls.

Following treatment, the animals showed clinical improvement compared with the untreated lambs and the faecal worm egg count was markedly reduced. On post mortem seven days after treatment, the percentage reductions in the worm burdens of the lambs following this single treatment were as follows: from the abomasum—Haemonchus spp. 92%, Ostertagia spp. 85% and Trichostrongylus spp. 87%; from the small intestine—Haemonchus spp. 100%, Ostertagia spp. 94%, Cooperia spp. 100%, Bunostomum spp. 85%, Nematodirus spp. 100% and unidentified immature worms 95% and from the caecum and the large intestine—Trichuris spp. 100% and Chabertia spp. 100%. In addition, there was on average only 20% of the number of lungworms Dictyocaulus filaria spp. in the treated animals compared with the untreated control animals.

What we claim is:

1. A member of the group consisting of the compound 2-β-methoxyethylpyridine and pharmaceutically-acceptable salts thereof.

2. 2-β-methoxyethylpyridine hydrochloride.

3. 2-β-methoxyethylpyridine hydrobromide.

4. Process for the manufacture of 2-β-methoxyethylpyridine which comprises generating 2-β-hydroxyethylpyridine in situ by reacting α-picoline with formaldehyde and then heating the resultant 2-β-hydroxyethylpyridine together with methanol and sodium hydroxide.

5. Process as claimed in claim 4 wherein the α-picoline and formaldehyde are heated together in an aqueous medium and under superatmospheric pressure at a temperature of about 130–160° C.

6. Process as claimed in claim 4 wherein the 2-β-hydroxyethylpyridine generated in situ is purified, before reaction with methanol, by distillation.

7. Process as claimed in claim 4 wherein the formaldehyde is present in a form selected from the group consisting of an aqueous formaldehyde solution, paraformaldehyde and trioxymethylene.

8. Process as claimed in claim 4 wherein the 2-β-hydroxyethylpyridine is generated in situ from α-picoline and aqueous formaldehyde followed by removal of the water and excess α-picoline by distillation and then reaction of the crude β-hydroxyethylpyridine so obtained with methanol in the presence of sodium hydroxide.

(References on following page)

References Cited by the Examiner

UNITED STATES PATENTS

| | | | |
|---|---|---|---|
| 2,667,491 | 1/1954 | Sutherland et al. | 260—297 |
| 2,731,384 | 1/1956 | O'Neill et al. | 167—53 |
| 2,967,182 | 1/1961 | Pohland | 260—297 |
| 3,042,682 | 7/1962 | Aries | 260—297 |

OTHER REFERENCES

Noller "Chemistry of Organic Compounds," 2nd Ed. pages 137–9 (1957) (Saunders).

Ohki et al., Chem. Abstracts, vol. 49, col. 1728 (1955).

Suzuki, Chem. Abstracts, vol. 51, cols. 7372–73 (1957).

WALTER A. MODANCE, *Primary Examiner*.

IRVING MARCUS, DUVAL T. McCUTCHEN, JOHN D. RANDOLPH, *Examiners*.